(12) United States Patent
Urban et al.

(10) Patent No.: US 6,174,361 B1
(45) Date of Patent: Jan. 16, 2001

(54) PROCESS FOR PREPARING N,N'-DIMETHYLPERYLENE-3,4,9,10-TETRACARBOXYLIC DIIMIDE IN TRANSPARENT PIGMENT FORM

(75) Inventors: Manfred Urban, Wiesbaden; Martin Boehmer, Neu-Anspach; Joachim Weber, Frankfurt, all of (DE)

(73) Assignee: Clariant GmbH, Frankfurt (DE)

( * ) Notice: Under 35 U.S.C. 154(b), the term of this patent shall be extended for 0 days.

(21) Appl. No.: 09/373,805

(22) Filed: Aug. 13, 1999

(30) Foreign Application Priority Data

Aug. 13, 1998 (DE) .............................. 198 36 714

(51) Int. Cl.[7] .............................. C09B 5/62; C09B 67/04; C07D 471/06
(52) U.S. Cl. .............................. 106/498; 546/37
(58) Field of Search .............................. 106/498; 546/37

(56) References Cited

U.S. PATENT DOCUMENTS

| | | | |
|---|---|---|---|
| 4,153,602 | 5/1979 | Schiessler et al. | 546/37 |
| 5,110,931 | 5/1992 | Dietz et al. | 546/37 |
| 5,626,662 | 5/1997 | Urban | 106/497 |
| 5,808,073 * | 9/1998 | Bohm et al. | 546/39 |
| 5,958,129 | 9/1999 | Urban et al. | 106/498 |

FOREIGN PATENT DOCUMENTS

| | | |
|---|---|---|
| 25 04 481 | 8/1976 | (DE) . |
| 0 318 022 | 5/1989 | (EP) . |
| 0 678 559 | 10/1995 | (EP) . |
| 0 864 613 | 9/1998 | (EP) . |
| 2029440 * | 3/1980 | (GB) . |

OTHER PUBLICATIONS

EPO Search Report (Nov. 8, 1999).

* cited by examiner

*Primary Examiner*—Anthony Green
(74) *Attorney, Agent, or Firm*—Susan S. Jackson; Scott E. Hanf

(57) ABSTRACT

The invention relates to a process for preparing N,N'-dimethylperylene-3,4,9,10-tetracarboxylic diimide, utilizing the reaction of perylene-3,4,9,10-tetracarboxylic dianhydride with monomethylamine, which comprises employing at least 2 times the molar amount of monomethylamine per mole of perylene-3,4,9,10-tetracarboxylic dianhydride and at least 3 times the amount by weight of water based on the weight of the dianhydride, conducting the reaction at a temperature from 50 to 200° C., removing unreacted monomethylamine by distillation, subjecting the resulting crude pigment to wet grinding in a liquid, aqueous or aqueous-organic medium in a stirred ballmill which is operated with a power density of more than 1.5 kW per liter of milling space and a stirrer tip speed of more than 12 m/s under the action of grinding media having a diameter of less than or equal to 0.9 mm, and isolating the pigment obtained, with the proviso that at any desired point during the process, but no later than during wet grinding, one or more additives from the group consisting of pigment dispersants and surfactants are added.

12 Claims, No Drawings

PROCESS FOR PREPARING N,N'-DIMETHYLPERYLENE-3,4,9,10-TETRACARBOXYLIC DIIMIDE IN TRANSPARENT PIGMENT FORM

CROSS-REFERENCE TO RELATED APPLICATION

The present invention is described in the German priority application No. 198 36 714.7 filed Aug. 13, 1998, which is hereby incorporated by reference as is fully disclosed herein.

BACKGROUND OF THE INVENTION

The present invention relates to a particularly environment-friendly and economic process for preparing transparent N,N'-dimethylperylene-3,4,9,10-tetracarboxylic diimide pigments for pigmenting materials of high molecular mass.

The pigmentation of automotive finishes, especially the metallic finishes, requires pigments which, with high transparency and a pure hue, produce strongly colored and highly lustrous coatings. The paint concentrates (millbases) and the paints themselves must be of low viscosity and should not exhibit any pseudoplasticity. A further requirement is for very good fastness properties, especially weather fastness.

N,N'-Dimethylperylene-3,4,9,10-tetracarboxylic diimide (dimethyl-perylimide), as an organic red or chestnut pigment (C.I. Pigment Red 179, C.I.No. 71130), has been in use for a long time, and both transparent and hiding forms of the pigment are known. Depending on the production conditions, red or chestnut-colored pigments are obtained. The following processes are described for its production:

DE-B-21 53 087 (GB-A-1 370 433) describes the reaction of perylene-3,4,9,10-tetracarboxylic dianhydride with monomethylamine at from 120 to 150° C. using high concentrations of the dianhydride. The crude dimethylperylimide pigments obtained in the condensation are isolated, dried and then converted to the final pigment form by an intensive grinding and kneading operation with salt followed by renewed drying. Following each stage of the process the pigment is isolated, so that there are large amounts of wastewater produced. However, the process does not yield a transparent dimethylperylimide pigment suitable for use in metallic finishes. DE-B-2 504 481 describes a process for producing transparent dimethylperylimide pigments by condensing perylene-3,4,9,10-tetracarboxylic dianhydride with at least 4 times the molar amount of monomethylamine. The excess monomethylamine is separated from the pigment suspension by filtration and can be distilled off from the mother liquor using steam. The filtration of the methylamine-containing suspension causes considerable technical problems, since because of its severe odor monomethylamine must not be allowed to pass into the environment. An additional distillation unit is required for working up the methylamine-containing mother liquor. Transparent pigments are obtained only in high dilution.

EP-A-0208 266 discloses the production of a hiding dimethylperylimide pigment. In this process, dry, finely divided, crude dimethylperylimide pigment with a particle size of less than 0.04 μm are subjected to a recrystallizing grinding process in a mill or disperser in the presence of an organic solvent, and the dimethylperylimide pigment is subsequently isolated.

EP-A-0 088 392 describes a process for producing transparent dimethylperylimide pigments by reacting peracid with at least 4 times the molar amount of monomethylamine. The excess monomethylamine has to be liberated from the mother liquor using sodium hydroxide solution and separated off by distillation. This produces considerable amounts of salts which load the wastewater.

EP-A-0 318 022 describes a process for preparing hiding dimethylperylimide pigments by reacting peracid with at least 2 times the molar amount of monomethylamine. The crude pigment obtained after the condensation is ground on a stirred ballmill and then finished with solvents. It is not possible to obtain transparent pigments by the condensation, beadmilling and finishing conditions described therein.

SUMMARY OF THE INVENTION

There was a need to prepare transparent dimethylperylimide pigments in a simple and environmentally unobjectionable manner.

It has been found that transparent dimethylperylimide pigments having advantageous coloristic and rheological properties can be prepared in a simple and ecologically unobjectionable manner from crude dimethylperylimide pigments by beadmilling at high energy density if surfactants and/or pigment dispersants are added no later than at the beadmilling stage.

DESCRIPTION OF THE PREFERRED EMBODIMENTS

The invention provides a process for preparing N,N'-dimethylperylene-3,4,9,10-tetracarboxylic diimide, utilizing the reaction of perylene-3,4,9,10-tetracarboxylic dianhydride with monomethylamine, which comprises employing at least 2 times the molar amount of monomethylamine per mole of perylene-3,4,9,10-tetracarboxylic dianhydride and at least 3 times the amount by weight of water based on the weight of the dianhydride, conducting the reaction at a temperature from 50 to 200° C., removing unreacted monomethylamine by distillation, subjecting the resulting crude pigment to wet grinding in a liquid, aqueous or aqueous-organic medium in a stirred ballmill which is operated with a power density of more than 1.5 kW per liter of milling space and a stirrer tip speed of more than 12 m/s under the action of grinding media having a diameter of less than or equal to 0.9 mm, and isolating the pigment obtained, with the proviso that at any desired point during the process, but no later than during wet grinding, one or more additives from the group consisting of pigment dispersants and surfactants are added.

The perylene-3,4,9,10-tetracarboxylic dianhydride can be employed in dry form or as the presscake.

The process of the invention is preferably conducted using from 5 to 12 times the amount by weight of water, in particular from 6 to 9 times the amount by weight of water, based on the weight of the dianhydride. It is preferred to employ from 3 to 10 times the molar amount, in particular from 3 to 8 times the molar amount, of monomethylamine per mole of dianhydride. The monomethylamine is preferably added in aqueous solution but can also be introduced in gaseous form.

The monomethylamine is judiciously added at a temperature between 0 and 80° C., preferably between 20 and 60° C. The reaction of the dianhydride with the monomethylamine takes place at a temperature between 50 and 200° C., preferably between 90 and 180° C., under superatmospheric pressure if desired. After the end of the reaction, excess monomethylamine is distilled off, advantageously at atmospheric pressure and up to a temperature of about 100° C. at the distillation bridge. Although it is advantageous to remove all of the excess monomethylamine prior to the grinding process, it is also possible to remove the monomethylamine later on—for example, after the grinding process, or only when the pigment is isolated.

The monomethylamine removed by distillation can be used again for a subsequent condensation reaction.

If desired, prior to wet grinding and/or prior to filtration, neutralization is carried out with a little acid in order to eliminate nuisance odors.

The coarsely crystalline crude perylene pigment obtained from the synthesis is either isolated and then sent, or sent directly, to a wet grinding stage for the purpose of fine division.

The production of these pigments in accordance with the invention requires a high level of grinding action, which is achieved through the use of specific embodiments of a stirred ballmill. Examples of such mills that are suitable for grinding to the required efficiency are those designed for continuous and batchwise working, having a cylindrical or hollow-cylindrical milling chamber in horizontal or vertical construction and the capacity to be operated with a specific power density of more than 1.5 kW per liter of milling space, their stirrer tip speed being more than 12 m/s. The constructional design ensures that the high level of grinding energy is transferred to the millbase. Examples of mills suitable for this purpose are described in DE-C 3 716 587. If the grinding intensity of the mill is too low, the good properties according to the invention, especially the high transparency and color strength and outstanding coloristic properties of the pigments, are not attained. The energy output by the stirrer mechanism per unit time is transferred to the millbase as comminution work and as frictional energy in the form of heat. In order to dissipate this large quantity of heat without problems, constructional measures must be taken to ensure that the ratio of milling space to milling space surface area (cooling surface) is kept as small as possible. At high throughputs, grinding is carried out in circulation and the heat is led off outward predominantly by way of the millbase. The grinding media used are beads of zirconium oxide, zirconium mixed oxide, aluminum oxide or quartz with a diameter of less than or equal to 0.9 mm; judiciously, use is made of those having a diameter of from 0.2 to 0.9 mm, preferably from 0.3 to 0.5 mm. When continuous stirred ballmills are used for fine division, the millbase is separated from the grinding media preferably by centrifugal deposition, so that there is virtually no contact between the separating apparatus and the grinding media; in this way, it is possible largely to prevent blockage of said apparatus. The stirred ballmills are in this case operated with a high degree of filling by grinding media. In the case of the continuous stirred ballmills, the milling space is filled almost completely with grinding media.

For grinding, use is made in accordance with the process of the crude pigments obtained in the synthesis, which following the grinding operation are in the form of finely divided pigments.

Grinding can be carried out in an aqueous, aqueous-organic or organic medium. Grinding is preferably carried out without the addition of solvents in an aqueous alkaline or neutral pH range. The pigment concentration in the millbase is dependent on the rheology of the suspension. It should be less than or equal to 30%, generally from 5 to 25% and, preferably, between 7.5 and 20%.

The duration of grinding is dependent on the fineness requirements for the particular field of application. Consequently, the residence time of the millbase in the stirred ballmill, depending on the required fineness, is generally between 5 and 60 minutes. It normally amounts to a period of from 10 to 45 minutes, preferably from 15 to 30 minutes.

Grinding is advantageously carried out at temperatures in the range from 0 to 100° C., judiciously at a temperature between 10 and 60° C., and preferably at from 20 to 50° C.

In addition to the liquid phase, the crude pigment, the surfactants and/or pigment dispersants, the millbase can also include other auxiliaries, such as fillers, standardizing agents, resins, antifoams, extenders, colorants, preservatives and drying retarders.

As the liquid grinding medium use is made of water, water-miscible $C_1$–$C_8$-alkanols such as methanol, ethanol, n-propanol, isopropanol, n-butanol, tert-butanol, isobutanol, pentanol, hexanol, alkylhexanols, ethylene glycol, propylene glycol or glycerol; cyclic alkanols such as cyclohexanol; $C_1$–$C_5$-dialkyl ketones such as acetone, diethyl ketone, methyl isobutyl ketone or methyl ethyl ketone; ethers and glycol ethers, such as dimethoxyethane, tetrahydrofuran, methyl glycol, ethyl glycol, butyl glycol, ethyl diglycol, methoxypropanol or methoxybutanol; aliphatic acid amides such as dimethylacetamide or dimethylformamide; cyclic carboxamides such as N-methylpyrrolidone, valerolactam and caprolactam, heterocyclic bases such as pyridine, morpholine or picoline; and also dimethyl sulfoxide or mixtures of these solvents with water. Particular preference is given to water and to solutions of $C_1$–$C_8$ alcohols in water.

The addition of the surfactants and/or pigment dispersants and/or other auxiliaries is made preferably before condensation or before beadmilling. However, surfactants and/or pigment dispersants and/or other auxiliaries can also be added during condensation or during grinding, all at once or in a number of portions. The total amount of surfactants and/or pigment dispersants added is judiciously from 1 to 25% by weight, preferably from 5 to 15% by weight, based on the crude pigment.

Suitable surfactants are anionic, cationic, and nonionic surfactants or mixtures thereof. Preference is given to surfactants or surfactant mixtures which do not foam during the distillation of the methylamine or during wet grinding.

Examples of suitable anionic surface-active agents are fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, such as palmitic, stearic and oleic acid, soaps, such as alkali metal salts of fatty acids, naphthenic acids and resin acids, for example abietic acid, alkali-soluble resins, such as rosin-modified maleate resins and condensates based on cyanuric chloride, taurine, N,N'-diethylaminopropylamine and p-phenylenediamine. Particular preference is given to resin soaps, i.e., alkali metal salts of resin acids.

Examples of suitable cationic surface-active agents are quaternary ammonium salts, fatty amine ethoxylates, fatty aminopolyglycol ethers and fatty amines.

Examples of suitable nonionic surface-active agents are amine oxides, fatty alcohol polyglycol ethers, fatty acid polyglycol esters and alkylphenol polyglycol ethers.

As pigment dispersants it is possible to employ compounds of the formula (I)

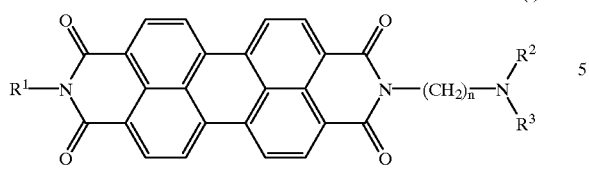

in which

R¹ is a hydrogen atom, a hydroxyl or amino group or a $C_1$–$C_{20}$-alkyl group which is perfluorinated or partly fluorinated and can be substituted by one or more, e.g. 1, 2, 3 or 4, chlorine or bromine atoms, a phenyl group, one or more, e.g. 1, 2, 3 or 4, cyano, hydroxyl, carbamoyl, $C_2$–$C_4$-acyl or $C_1$–$C_4$-alkoxy groups, e.g. methoxy or ethoxy; and R² and R³ independently of one another are a hydrogen atom, a substituted or unsubstituted, or perfluorinated or partly fluorinated alkyl group of 1 to 20 carbon atoms, or a substituted or unsubstituted, or perfluorinated or partly fluorinated alkenyl group of 2 to 20 carbon atoms, it being possible for the substituents to be hydroxyl, phenyl, cyano, chlorine, bromine, $C_2$–$C_4$-acyl or $C_1$–$C_4$-alkoxy and to be preferably 1 to 4 in number or R² and R³, together with the nitrogen atom, form a saturated, unsaturated or aromatic heterocyclic ring which if desired contains a further nitrogen, oxygen or sulfur atom in the ring; and n is a number from 1 to 6;

and/or compounds having the formula (II)

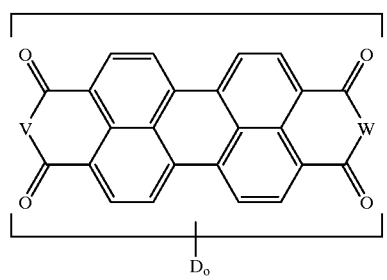

are employed in which

V is a bivalent radical —O—, >NR⁴ or >NR⁵—Y⁻X⁺ and

W is the bivalent radical >NR⁵—Y⁻X⁺,

D is a chlorine or bromine atom and if o>1, may represent a combination thereof, and o is a number from 0 to 4;

R⁴ is a hydrogen atom or a $C_1$–$C_{18}$-alkyl group, in particular $C_1$–$C_4$-alkyl, or is a phenyl group which is unsubstituted or can be substituted one or more times, for example 1, 2 or 3 times by halogen such as chlorine or bromine, $C_1$–$C_4$-alkyl such as methyl or ethyl, $C_1$–$C_4$-alkoxy such as methoxy or ethoxy, or phenylazo, R⁵ is a $C_1$–$C_{18}$-alkylene group which within the C—C chain can be interrupted one or more times, for example 1 to 10 times, by a bridging link from the series consisting of —O—, —NR⁶—, —S—, phenylene, —CO—, —SO₂— and —CR⁷R⁸— or any chemically possible combination thereof and in which the constituents R⁶, R⁷ and R⁸ independently of one another are each a hydrogen atom or a $C_1$–$C_4$-alkyl group which can be unsubstituted or substituted by heterocyclic radical, preferably of the imidazole or piperazine type, but in particular are a straight-chain or branched $C_1$–$C_6$-alkylene group such as ethylene or propylene, or R⁵ is a phenylene group which can be unsubstituted or substituted one or more times, for example 1 to 3 times, by $C_1$–$C_4$-alkyl such as methyl or ethyl or by $C_1$–$C_4$-alkoxy such as methoxy or ethoxy, Y⁻ is one of the anionic radicals —SO₃⁻ and —COO⁻, and X⁺ has the definition of H⁺ or the equivalent $$\frac{M^{m+}}{m}$$

of a metal cation from main groups 1 to 5 or transition groups 1 or 2 or 4 to 8 of the Periodic Table of the Chemical Elements, m being 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; or defines an ammonium ion $N^+R^9R^{10}R^{11}R^{12}$, the substituents R⁹, R¹⁰, R¹¹ and R¹² on the quaternary nitrogen atom being each independently of one another a hydrogen atom or a group from the series consisting of $C_1$–$C_{30}$-alkyl, $C_2$–$C_{30}$-alkenyl, $C_5$–$C_{30}$-cycloalkyl, unsubstituted or $C_1$–$C_8$-alkylated phenyl or a (poly) alkyleneoxy group

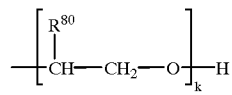

in which R⁸⁰ is hydrogen or $C_1$–$C_4$-alkyl and k is a number from 1 to 30;

and in which alkyl, alkenyl, cycloalkyl, phenyl or alkylphenyl identified as R⁹, R¹⁰, R¹¹ and R¹² can be substituted by amino, hydroxyl and/or carboxyl;

or where the substituents R⁹ and R¹⁰ together with the quarternary nitrogen atom, may form a five- to seven-membered saturated ring system which if desired includes further heteroatoms such as an oxygen, sulfur and/or nitrogen atom, said ring system being, for example, of the pyrrolidone, imidazolidine, hexamethyleneimine, piperidine, piperazine or morpholine type;

or where the substituents R⁹, R¹⁰ and R¹¹, together with the quaternary nitrogen atom, may form a 5- to 7-membered aromatic ring system which if desired includes further heteroatoms such as an oxygen, sulfur and/or nitrogen atom and to which, if desired, additional rings are fused on, said ring system being, for example, of the pyrrole, imidazole, pyrrodine, picoline, pyrazine, quinoline or isoquinoline type;

and/or compounds having the formula (III)

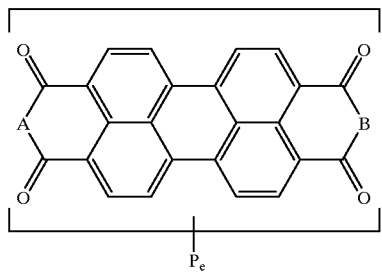

are employed in which

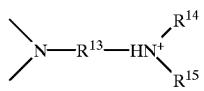

A is a cationic bivalent radical of the formula and
B is an anionic bivalent radical of the formula

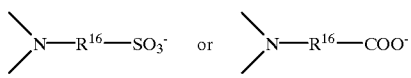

e is a number from 0 to 8, preferably from 1 to 6, and, if e>0,
P is a chlorine or bromine atom, and if e>1, P may represent a combination thereof,
$R^{13}$ is a $C_1$–$C_{12}$-alkylene group, preferably a $C_2$–$C_6$-alkylene group, an aralkylene group or an arylene group, preferably phenylene or benzylene,
$R^{14}$ and $R^{15}$ are identical or different and are a hydrogen atom, a substituted or unsubstituted $C_1$–$C_{20}$-alkyl radical, preferably a $C_1$–$C_6$-alkyl radical, or a substituted or unsubstituted $C_2$–$C_{20}$-alkenyl radical, that $R^{14}$ and $R^{15}$ are not simultaneously hydrogen, or
$R^{14}$ and $R^{15}$, together with the adjacent nitrogen atom, form a heterocyclic ring system which contains 1, 2 or 3 of the heteroatoms O, S and/or N in the ring and to which, if desired, additional rings are fused on, e.g., quinoline or isoquinoline, and
$R^{16}$ is a straight-chain or branched $C_1$–$C_{12}$-alkylene group, preferably a $C_1$–$C_6$-alkylene group;
and/or compounds having the formula (IV)

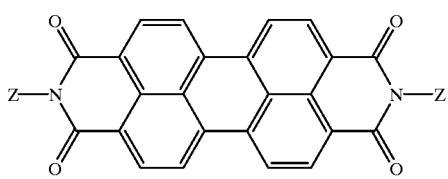

are employed, in which Z has the definition $Z^1$, $Z^2$ or $Z^3$, with the proviso that the two Zs are not simultaneously $Z^3$, where $Z^1$ is a radical of the formula (IVa)

$$-[X-Y]_q-[X^1-Y^1]_r-[X^2-NH]_sH \quad (IVa)$$

in which
X, $X^1$ and $X^2$ are identical or different and are a branched or unbranched $C_2$–$C_6$-alkylene radical, or a $C_5$–$C_7$-cycloalkylene radical which can be substituted by from 1 to 4 $C_1$–$C_4$-alkyl radicals, hydroxyl radicals, hydroxyalkyl radicals of 1 to 4 carbon atoms and/or by 1 to 2 further $C_5$–$C_7$-cycloalkyl radicals;
Y and $Y^1$ are identical or different and are an NH—, —O— or N($C_1$–$C_6$-alkyl) group, preferably NCH$_3$ or

q is a number from 1 to 6, preferably 1, 2, 3 or 4;
r and s independently of one another are a number from 0 to 6, preferably 0, 1 or 2, and r and s are not simultaneously zero;
$Z^2$ is a radical of the formula (IVb)

$$-[X-O]_{q1}-[X^1-O]_qH \quad (IVb)$$

in which
q1 is a number from 0 to 6; preferably 0, 1, 2, 3 or 4; and
$Z^3$ is hydrogen, hydroxyl, amino or $C_1$–$C_8$-alkyl, it being possible for the alkyl group to be substituted by 1 to 4 substituents from the group consisting of Cl, Br, CN, OH, $C_6H_5$, carbamoyl, $C_1$–$C_4$-acyl, $C_1$–$C_4$-alkoxy and $NR^2R^3$, or is perfluorinated or partly fluorinated, where
$R^2$ and $R^3$ independently of one another are a hydrogen atom or a substituted or unsubstituted, or perfluorinated or partly fluorinated alkyl group of 1 to 20 carbon atoms, or a substituted or unsubstituted, or perfluorinated or partly fluorinated alkenyl group of 2 to 20 carbon atoms, it being possible for the substituents to be hydroxyl, phenyl, cyano, chlorine, bromine, $C_2$–$C_4$-acyl or $C_1$–$C_4$-alkoxy, or $R^2$ and $R^3$, together with the nitrogen atom, form a saturated, unsaturated or aromatic heterocyclic ring which if desired contains a further nitrogen, oxygen or sulfur atom in the ring.

Preferably, the pigment is isolated directly after wet grinding. However, it is possible to conduct an aftertreatment (finish) with or without organic solvents, at temperatures, for example, of from 40 to 160° C.

It is also possible to subject the as-ground pigment suspensions to concentrated evaporation or spray drying and in this case filtration can be omitted.

In accordance with the process of the invention, these perylene pigments are prepared without waste products. The few chemicals can be processed further or fully regenerated.

It was surprising and was not foreseeable that the production of transparent dimethylperylimide pigments would be possible in this simple and technically elegant manner, without environmental problems, since in accordance with the known processes the production of transparent pigments is possible only in high dilution and with considerable levels of environmental pollution. Perylene pigments produced by the process of the invention are markedly superior in their coloristic and performance properties to the pigments produced by known processes.

The dimethylperylimide pigments produced in accordance with the process of the invention can be used to prepare automotive finishes, especially metallic finishes with a high pigment concentration. The coatings obtained are transparent and lustrious, with excellent fastness to overcoating and weathering.

The pigment concentrates (millbases) and the coating materials additionally possess very good flow behavior at high pigment concentration, and an outstanding stability to flocculation.

Perylene pigments produced in accordance with the invention are particularly suitable for pigmenting natural or synthetic organic materials of high molecular mass, such as, for example, cellulose ethers and cellulose esters, such as ethylcellulose, nitrocellulose, cellulose acetate, cellulose butyrate, natural resins or synthetic resins, such as addition polymerization resins or condensation resins, e.g. amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

It is irrelevant in this context whether the high molecular mass organic materials referred to are in the form of plastic masses, melts, spinning solutions, varnishes, paints or printing inks. Depending on the intended application it proves advantageous to utilize the pigments obtained in accordance with the invention as blends or in the form of preparations or dispersions. Based on the high molecular mass organic material to be pigmented, the pigments produced in accordance with the invention are employed in an amount of preferably from 0.1 to 10%. Usintg the dimethylperylimide pigments produced in accordance with the process of the invention, it is possible to pigment the industrially common stoving enamels from the class of the alkyd-melamine resin varnishes, acrylic-melamine resin varnishes, polyester varnishes, high-solids acrylic resin varnishes, aqueous, polyurethane-based varnishes, and two-component varnishes based on polyisocyanate-crosslinkable acrylic resins, and especially automotive metallic varnishes.

The pigments produced in accordance with the invention are also suitable as colorants in electrophotographic toners and developers, such as one- or two-component powder tones (also referred to as one- or two-component developers, magnetic toners, liquid toners, polymerization toners and specialty toners.

Typical toner binders are addition polymerization, polyaddition and polycondensation resins, such as styrene, styrene-acrylate, styrene-butadiene, acrylate, polyester, phenol-epoxy resins, polysulfones, polyurethanes, individually or in combination, and also polyethylene and polypropylene, which may include further constituents, such as charge control agents, waxes or flow assistants, or may be modified subsequently with these additives.

Furthermore, the pigments produced in accordance with the invention are suitable as colorants in powders and powder coating materials, especially in triboelectrically or electrokinetically sprayable powder coating materials which are used to coat the surfaces of articles made, for example, from metal, wood, plastic, glass, ceramic, concrete, textile material, paper or rubber. Typical powder coating resins employed are epoxy resins, carboxyl- and hydroxyl-containing polyester resins, polyurethane resins and acrylic resins together with customary hardeners. Resin combinations are also used. For example, epoxy resins are frequently employed in combination with carboxyl- and hydroxyl-containing polyester resins. Examples of typical hardener components (depending on the resin system) are acid anhydrides, imidazoles, and also dicyandiamide and its derivatives, blocked isocyanates, bisacylurethanes, phenolic and melamine resins, triglycidyl isocyanurates, oxazolines and dicarboxylic acids.

In addition, the pigments produced in accordance with the invention are suitable for use as colorants in ink jet inks on either an aqueous or nonaqueous basis and in those inks which operate in accordance with the hot melt technique. In addition to this, the pigments produced in accordance with the invention are also suitable as colorants for color filters, both for subtractive and additive color generation.

In order to evaluate the properties in the coatings sector of the pigments produced in accordance with the invention, a selection was made from among the large number of known varnishes of an alkyd-melamine resin varnish (AM) containing aromatic components and based on a medium-oil alkyd resin and on a butanol-etherified melamine resin, of a polyester varnish (PE) based on cellulose acetobutyrate, of a high-solids acrylic resin stoving enamel based on a non-aqueous dispersion (HS), and of an aqueous, polyurethane-based varnish (PU).

The color strength and hue were determined in accordance with DIN 55986.

The rheology of the millbase following dispersion (millbase rheology, was evaluated on the basis of the following five-point scale:
5 highly fluid
4 liquid
3 viscous
2 slightly set
1 set Following dilution of the millbase to the final pigment concentration, the viscosity was evaluated using the Rossmann viscospatula, type 301, from Erichsen. Gloss measurements were carried out on cast films at an angle of 20° in accordance with DIN 67530 (ASTMD 523) using the "multigloss" gloss meter from Byk-Mallinckrodt. The solvent fastness was determined in accordance with DIN 55976.

The fastness to overcoating was determined in accordance with DIN 53221.

EXAMPLES

In the examples below, parts and percentages are each based on the weight of the substances so described.

Example 1

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The crude pigment suspension is cooled to 20° C.

This gives 1339.7 parts of crude pigment suspension with a concentration of 12.4%. A stirred ballmill (manufacturer: Draiswerke GmbH, Mannheim) which is filled with 410 parts of zirconium mixed oxide beads of diameter 0.3–0.4 mm as grinding media is charged with 80.8 parts of the 12.4% crude pigment suspension and 19.2 parts of water, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 9.6 parts of pigment. In the PE varnish, strongly colored red transparent coatings are obtained. The metallic coating is strong and deeply colored. The gloss measurement gives a value of 47 and the viscosity measurement a value of 3.5 s.

Comparative Example 1a
(Repetition of Example 1 but Beadmilling with Low Energy Input)

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The crude pigment suspension is cooled to 20° C.

This gives 1629 parts of crude pigment suspension with a concentration of 10.0%. A stirred ballmill with disk-type stirring mechanism (manufacturer: Draiswerke GmbH, Mannheim) which is filled with 1000 parts of quartz beads of diameter 1 mm as grinding media is charged with 350 parts of the 10.0% crude pigment suspension, and grinding is carried out for 1 hour at 25° C. at a stirrer tip speed of 10.2 m/s and a specific power density of 0.45 kW per liter of milling space. The millbase suspension is subsequently sieved to remove the grinding media, which are rinsed off with water, and the millbase suspensions are combined, filtered with suction, and the solid product is washed with water and dried at 80° C.

This gives 33.9 parts of pigment. In the PE varnish, hiding coatings are obtained. The pigment is therefore unsuitable for metallic finishes.

Comparative Example 1b
(Repetition of Example 1 but Beadmilling with Low Energy Input and 0.3–0.4 mm Grinding Media)

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The crude pigment suspension is cooled to 20° C.

This gives 1629 parts of crude pigment suspension with a concentration of 10.0%. A stirred ballmill with disk-type stirring mechanism (manufacturer: Draiswerke GmbH, Mannheim) which is filled with 1500 parts of zirconium mixed oxide beads of diameter 0.3–0.4 mm as grinding media is charged with 350 parts of the 10.0% crude pigment suspension, and grinding is carried out for 1 hour at 25° C. at a stirrer tip speed of 10.2 m/s and a specific power density of 0.45 kW per liter of milling space. The millbase suspension is subsequently sieved to remove the grinding media, which are rinsed off with water, and the millbase suspensions are combined, filtered with suction, and the solid product is washed with water and dried at 80° C.

This gives 33.5 parts of pigment. In the PE varnish, hiding coatings are obtained. The pigment is therefore unsuitable for metallic finishes.

Comparative Example 1c
(Repetition of Example 1 without Beadmilling)

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The pigment suspension is cooled to 20° C., filtered with suction, the solid product is washed with water, and the resulting perylenediamide is dried at 80° C.

This gives 165.9 parts of N,N'-dimethylperylene-3,4,9,10-tetracarboxylic diimide. In the PE varnish, weakly colored hiding coatings are obtained. The metallic coating is weakly colored and matt. The gloss measurement gives a value of 5 and the viscosity measurement a value of 1.9 s.

Example 2

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The crude pigment suspension is cooled to 20° C.

This gives 1339.7 parts of crude pigment suspension with a concentration of 12.4%. A stirred ballmill (manufacturer: Draiswerke GmbH, Mannheim) which is filled with 419 parts of zirconium mixed oxide beads of diameter 0.3–0.4 mm as grinding media is charged with 60.6 parts of the 12.4% crude pigment suspension and 39.4 parts of water, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 7.2 parts of pigment. In the PE varnish, strongly colored transparent coatings are obtained. The metallic coating is strongly colored and clean. The gloss measurement gives a value of 33 and the viscosity measurement a value of 4.0 s.

Example 3

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, 7.5 parts of dimethyldistearylammonium chloride are added and the monomethylamine is distilled off at up to 100° C. at the bridge. The crude pigment suspension is cooled to 20° C.

This gives 1676 parts of crude pigment suspension with a concentration of 10.4%. A stirred ballmill (manufacturer Draiswerke GmbH, Mannheim) which is filled with 360 parts of zirconium mixed oxide beads of diameter 0.3–0.4 mm as grinding media is charged with 100 parts of the 10.4% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is adjusted to a pH of 5–6 by adding acetic acid, subsequently filtered with suction, the solid product is washed with water, and the resulting pigment is dried at 80° C.

This gives 8.4 parts of pigment. In the PE varnish, strongly colored transparent coatings are obtained. The metallic coating is strongly colored and clean. The gloss measurement gives a value of 33 and the viscosity measurement a value of 2.9 s.

Example 4

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, 7.5 parts of dimethyldistearylammonium chloride are added and the monomethylamine is distilled off at up to 100° C. at the bridge. The crude pigment suspension is cooled to 20° C.

This gives 1676 parts of crude pigment suspension with a concentration of 10.4%. A stirred ballmill (manufacturer: Draiswerke GmbH, Mannheim) which is filled with 360 parts of zirconium mixed oxide beads of diameter 0.3–0.4 mm as grinding media is charged with 100 parts of the 10.4% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is adjusted to a pH of 8 by adding acetic acid, subsequently filtered with suction, the solid product is washed with water, and the resulting pigment is dried at 80° C.

This gives 8.7 parts of pigment. In the PE varnish, strongly colored transparent coatings are obtained. The metallic coating is strongly colored. The gloss measurement gives a value of 26 and the viscosity measurement a value of 2.7 s.

Example 5

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, 7.5 parts of dimethyldistearylammonium chloride are added and the monomethylamine is distilled off at up to 100° C. at the bridge. The crude pigment suspension is cooled to 20° C.

This gives 1676 parts of crude pigment suspension with a concentration of 10.4%. A stirred ballmill (manufacturer: Draiswerke GmbH, Mannheim) which is filled with 342 parts of zirconium mixed oxide beads of diameter 0.3–0.4 mm as grinding media is charged with 100 parts of the 10.4% crude pigment suspension, and grinding is carried out for 30 minutes at 20° C. at a tip speed of 17.7 m/s and a power density of 3.5 kW/l milling space. The millbase is then sieved to separate off the grinding media. The millbase suspension is adjusted to a pH of 5–6 by adding acetic acid, subsequently filtered with suction, the solid product is washed with water, and the resulting pigment is dried at 80° C.

This gives 10 parts of pigment. In the PE varnish, strongly colored transparent coatings are obtained. The metallic coating is strongly colored and clean. The gloss measurement gives a value of 50.

Example 6

A stirred vessel is initially charged with 1350 parts of water, and, at 25° C., 150 parts of perylene-3,4,9,10-tetracarboxylic dianhydride, 249.5 parts of a 40% strength aqueous monomethylamine solution and 15 parts of pigment dispersant having the formula (III) are added in succession and with stirring. In the bivalent radical A of this formula, $R^{13}$ is a propylene group, $R^{14}$ and $R^{15}$ are each an ethyl group, and in the bivalent radical B of this formula $R^{16}$ is a methylene group and e is 0. The pigment dispersant is present in the form of an inner salt. The mixture is heated to boiling and stirred at boiling for 2 hours. Subsequently, 28.2 parts of a 29% strength aqueous solution of hexadecyltrimethylammonium chloride are added and the monomethylamine is distilled off at up to 100° C. at the bridge. The crude pigment suspension is cooled to 20° C.

This gives 1599 parts of crude pigment suspension with a concentration of 10.4%. A stirred ballmill (manufacturer: Draiswerke GmbH, Mannheim) which is filled with 360 parts of zirconium mixed oxide beads of diameter 0.3–0.4 mm as grinding media is charged with 86.5 parts of the 10.4% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment formulation is dried at 80° C.

This gives 7.7 parts of pigment formulation. In the HS varnish, strongly chestnut-colored transparent coatings are obtained. The gloss measurement gives a value of 75. The pigment formulation is not flocculated.

Example 7

A stirred vessel is initially charged with 1350 parts of water, and, at 60° C., 150 parts of perylene-3,4,9,10-tetracarboxylic dianhydride, 15 parts of a 50% strength aqueous resin soap and 89 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The suspension is subsequently heated to 125° C. and stirred at 125° C. for 3 hours. After the end of reaction, the crude pigment suspension is cooled to 20° C.

This gives 1537 parts of crude pigment suspension with a concentration of 9.0%. A stirred ballmill (manufacturer: Draiswerke GmbH, Mannheim) which is filled with 360 parts of zirconium mixed oxide beads of diameter 0.3–0.4 mm as grinding media is charged with 100 parts of the 9.0% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 7.5 parts of pigment. In the PE varnish, strongly colored transparent coatings are obtained. The metallic coating is strongly colored and deep. The gloss measurement gives a value of 63 and the viscosity measurement gives a value of 3.4 s. The rheology is evaluated as 3.

Example 8

A stirred vessel is initially charged with 1350 parts of water, and, at 25° C., 150 parts of perylene-3,4,9,10-tetracarboxylic dianhydride, 15 parts of pigment dispersant having the formula (II) and 249.5 parts of a 40% strength aqueous monomethylamine solution are added in succession and with stirring. In the bivalent radicals V and W of this formula, $R^5$ is in each case an ethylene group, $Y^-$ is the radical $—SO_3^-$, $X^+$ is a proton and o is 0. The mixture is heated to boiling and stirred at boiling for 2 hours. Subsequently, the monomethylamine is distilled off at up to 100° C. at the bridge. After that, 52.6 parts of a 29% strength aqueous solution of hexadecyltrimethylammonium chloride are added. The crude pigment suspension is cooled to 20° C.

This gives 1664 parts of crude pigment suspension with a concentration of 11.1%. A stirred ballmill (manufacturer: Draiswerke GmbH, Mannheim) which is filled with 342 parts of zirconium mixed oxide beads of diameter 0.3–0.4 mm as grinding media is charged with 100 parts of the 11.1% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment formulation is dried at 80° C.

This gives 9.3 parts of pigment formulation. In the HS varnish, strongly colored transparent coatings are obtained. The gloss measurement gives a value of 77.

Example 9

A stirred vessel is initially charged with 1350 parts of water, and, at 50° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The pigment suspension is cooled to 20° C.

This gives 1482 parts of crude pigment suspension with a concentration of 10.8%. A stirred ballmill (manufacturer: Draiswerke GmbH, Mannheim) which is filled with 364 parts of zirconium mixed oxide beads of diameter 0.3–0.4 mm as grinding media is charged with 92.6 parts of the 10.8% crude pigment suspension and 7.4 parts of water, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 8.9 parts of pigment. In the PE varnish, strongly colored transparent coatings are obtained. The metallic coating is strongly and deeply colored. The gloss measurement gives a value of 70 and the viscosity measurement gives a value of 3.4 s. The solvent fastness is excellent.

Example 10
(Repetition of Example 1 but not Adding Resin Soap and Dimethyldistearylammonium Chloride until the Grinding Stage)

A stirred vessel is initially charged with 1350 parts of water, and, at 25° C., 150 parts of perylene-3,4,9,10-tetracarboxylic dianhydride and 249.5 parts of a 40% strength aqueous monomethylamine solution are added in succession and with stirring. The mixture is heated to boiling and stirred at boiling for 2 hours. Subsequently, the monomethylamine is distilled off at up to 100° C. at the bridge. The crude pigment suspension is cooled to 20° C.

This gives 1662 parts of crude pigment suspension with a concentration of 9.6%. A stirred ballmill (manufacturer: Draiswerke GmbH, Mannheim) which is filled with 416 parts of zirconium mixed oxide beads of diameter 0.3–0.4 mm as grinding media is charged with 98.6 parts of the 9.6% crude pigment suspension, 0.9 parts of a 50% strength aqueous resin soap and 0.45 parts of dimethyldistearylammonium chloride, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 9.4 parts of pigment. In the PE varnish, strongly colored transparent coatings are obtained. The metallic coating is transparent and strongly colored. The gloss measurement gives a value of 59 and the viscosity measurement a value of 2.3 s. The rheology is evaluated as being 4.

Comparative Example 10a
(Repetition of Example 10 but Condensing and Beadmilling without Resin Soap and Dimethyldistearylammonium Chloride)

A stirred vessel is initially charged with 1350 parts of water, and, at 25° C., 150 parts of perylene-3,4,9,10-tetracarboxylic dianhydride and 249.5 parts of a 40% strength aqueous monomethylamine solution are added in succession and with stirring. The mixture is heated to boiling and stirred at boiling for 2 hours. Subsequently, the monomethylamine is distilled off at up to 100° C. at the bridge. The crude pigment suspension is cooled to 20° C.

This gives 1662 parts of crude pigment suspension with a concentration of 9.6%. A stirred ballmill (manufacturer: Draiswerke GmbH, Mannheim) which is filled with 420 parts of zirconium mixed oxide beads of diameter 0.3–0.4 mm as grinding media is charged with 98.6 parts of the 9.6% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 9.4 parts of pigment. In the PE varnish, hiding and weakly colored coatings are obtained. The metallic coating is weakly colored and cloudy. The gloss measurement gives a value of 5 and the viscosity measurement a value of 2.4 s.

Comparative Example 10b
(Repetition of Example 10 but not Adding Resin Soap and Dimethyldistearylammonium Chloride until after Beadmilling)

A stirred vessel is initially charged with 1350 parts of water, and, at 25° C., 150 parts of perylene-3,4,9,10-tetracarboxylic dianhydride and 249.5 parts of a 40% strength aqueous monomethylamine solution are added in succession and with stirring. The mixture is heated to boiling and stirred at boiling for 2 hours. Subsequently, the monomethylamine is distilled off at up to 100° C. at the bridge. The crude pigment suspension is cooled to 20° C.

This gives 1662 parts of crude pigment suspension with a concentration of 9.6%. A stirred ballmill (manufacturer: Draiswerke GmbH, Mannheim) which is filled with 420 parts of zirconium mixed oxide beads of diameter 0.3–0.4 mm as grinding media is charged with 98.6 parts of the 9.6% crude pigment suspension, and grinding is carried out for 30 minutes at 20° C. at a tip speed of 15.8 m/s and a power density of 3.5 kW/l milling space. The millbase is then sieved to separate off the grinding media. To the millbase suspension there are added at 25° C., in succession 0.9 parts of a 50% strength aqueous resin soap and 0.45 parts of dimethyldistearylammonium chloride, and the suspension is stirred at 25° C. for 1 hour. Subsequently, the pigment is filtered with suction, washed with water and the resulting pigment is dried at 80° C.

This gives 9.2 parts of pigment. In the PE varnish, hiding coatings are obtained.

Example 11

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The pigment suspension is cooled to 20° C.

This gives 1339.7 parts of crude pigment suspension with a concentration of 12.4%. A stirred ballmill (manufacturer: Draiswerke GmbH, Mannheim) which is filled with 357 parts of zirconium mixed oxide beads of diameter 0.3–0.4 mm as grinding media is charged with 80.8 parts of the 12.4% crude pigment suspension and 19.2 parts of water, and grinding is carried out for 10 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 9.7 parts of pigment. In the PE varnish, strongly colored transparent coatings are obtained. The metallic coating is strongly and deeply colored. The gloss measurement gives a value of 86 and the viscosity measurement gives a value of 3.5 s.

Example 12

A stirred vessel is initially charged with 1350 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring. The mixture is heated to boiling and stirred at boiling for 2 hours. Subsequently, an aqueous solution of 7.5 parts of dimethyldistearylammonium chloride and 328 parts of water is added and the monomethylamine is distilled off at up to 100° C. at the bridge. The crude pigment suspension is cooled to 20° C.

This gives 1339.7 parts of crude pigment suspension with a concentration of 12.4%. A stirred ballmill (manufacturer: Draiswerke GmbH, Mannheim) which is filled with 368 parts of zirconium mixed oxide beads of diameter 0.3–0.4 mm as grinding media is charged with 80.8 parts of the 12.4% crude pigment suspension, 14.7 parts of water and 4.5 parts of ethanol, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 10.0 parts of pigment. In the AM varnish, strongly colored transparent coatings are obtained. The gloss measurement gives a value of 84. The fastness to overcoating is excellent.

Example 13

A stirred vessel is initially charged with 1350 parts of water, and, at 25° C., 150 parts of perylene-3,4,9,10-tetracarboxylic dianhydride, 72.8 parts of a condensation product based on cyanuric chloride, taurine, N,N'-diethylaminopropylamine and p-phenylenediamine, with a concentration of 22.4%, and 249.5 parts of a 40% strength aqueous monomethylamine solution are added in succession and with stirring and stirred at 25° C. for 1 hour. The mixture is then heated to boiling and stirred at boiling for 2 hours. Subsequently, the monomethylamine is distilled off at up to 100° C. at the bridge. The crude pigment suspension is cooled to 20° C.

This gives 1392 parts of crude pigment suspension with a concentration of 11.7%. A stirred ballmill (manufacturer: Draiswerke GmbH, Mannheim) which is filled with 402 parts of zirconium mixed oxide beads of diameter 0.3–0.4 mm as grinding media is charged with 85.2 parts of the 11.7% crude pigment suspension and 14.8 parts of water, and grinding is carried out for 30 minutes at 20° C. at a tip speed of 15.8 m/s and a power density of 3.5 kW/l milling space. The millbase is then sieved to separate off the grinding media. The millbase suspension is subsequently concentrated to dryness under reduced pressure.

This gives 10.4 parts of pigment. 7.6 parts of pigment are mixed mechanically with 0.4 parts of pigment dispersant of the formula (II). In the bivalent radical V of this formula, $R^4$ is a methyl group, and in the bivalent radical W $R^5$ is a methylene group, $Y^-$ is the radical $-SO_3^-$, $X^+$ is a hydrogen ion and o is 0. A pigment formulation is obtained. In the PUR varnish, strongly colored transparent coatings are obtained. The metallic coating is strongly colored.

Example 14

A stirred vessel is initially charged with 750 parts of water, and, at 25° C., 150 parts of perylene-3,4,9,10-tetracarboxylic dianhydride, 15 parts of a 50% strength aqueous resin soap and 249.5 parts of a 40% strength aqueous monomethylamine solution are added in succession and with stirring and stirred at 25° C. for 1 hour.

Subsequently, an aqueous solution of 7.5 parts of dimethyldistearylammonium chloride and 328 parts of water is added. The mixture is heated to boiling and stirred at boiling for 2 hours, and then the monomethylamine is distilled off at up to 100° C. at the bridge. The pigment suspension is cooled to 20° C.

This gives 1416 parts of crude pigment suspension with a concentration of 11.3%. A stirred ballmill (manufacturer: Draiswerke GmbH, Mannheim) which is filled with 366 parts of zirconium mixed oxide beads of diameter 0.3–0.4 mm as grinding media is charged with 88.2 parts of the 11.3% crude pigment suspension and 11.8 parts of water, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 8.5 parts of pigment. In the PE varnish, strongly colored red transparent coatings are obtained. The metallic coating is strongly and deeply colored and clean. The gloss measurement gives a value of 68 and the viscosity measurement gives a value of 3.8 s.

Example 15

A stirred vessel is initially charged with 879 parts of water, and, at 25° C., 100 parts of perylene-3,4,9,10-tetracarboxylic dianhydride, 26.1 parts of pigment dispersant having the formula (IV), as a 19.1% presscake, and 166.3 parts of a 40% strength aqueous monomethylamine solution are added in succession and with stirring. In this formula, Z is a hydroxyethylene group and $Z^1$ is the radical of the formula IVa in which X and $X^2$ are each a propylene radical and Y is an NH group, q and s are 1 and r is 0. The mixture is heated to boiling and stirred at boiling for 2 hours and the monomethylamine is distilled off at up to 100° C. at the bridge. The crude pigment suspension is cooled to 20° C.

This gives 985.9 parts of crude pigment suspension with a concentration of 11.2%. A stirred ballmill (manufacturer: Draiswerke GmbH, Mannheim) which is filled with 360 parts of zirconium mixed oxide beads of diameter 0.3–0.4 mm as grinding media is charged with 80.8 parts of the 12.4% crude pigment suspension, and grinding is carried out for 30 minutes at 20° C. at a tip speed of 15.8 m/s and a power density of 3.5 kW/l milling space. The millbase is then sieved to separate off the grinding media. The millbase suspension is subsequently filtered with suction, the solid product is washed with water, and the resulting pigment is dried at 80° C.

This gives 8.9 parts of pigment. In the HS varnish, strongly colored transparent coatings are obtained. The gloss measurement gives a value of 73 and the viscosity measurement gives a value of 3.5 s. The rheology is evaluated as being 3.

What is claimed is:
1. A process for preparing N,N'-dimethylperylene-3,4,9,10-tetracarboxylic diimide, utilizing the reaction of perylene-3,4,9,10-tetracarboxylic dianhydride with monomethylamine, which comprises employing at least 2 times the molar amount of monomethylamine per mole of perylene-3,4,9,10-tetracarboxylic dianhydride and at least 3 times the amount by weight of water based on the weight of the dianhydride, conducting the reaction at a temperature from 50 to 200° C., removing unreacted monomethylamine by distillation to produce crude N,N'-dimethylperylene-3,4,9,10-tetracarboxylic diimide pigment, subjecting the crude pigment to wet grinding in a liquid, aqueous or aqueous-organic medium in a stirred ballmill which is operated with a power density of more than 1.5 kW per liter of milling space and a stirrer tip speed of more than 12 m/s under the action of grinding media having a diameter of less than or equal to 0.9 mm, and isolating the pigment obtained, with the proviso that at any point during the process, but no later than during wet grinding, one or more additives selected from the group consisting of anionic surfactants, cationic surfactants, nonionic surfactants, and pigment dispersants are added in a total amount of from 1–25% by weight, based on the crude pigment, and wherein the pigment dispersant is of the formula (I)

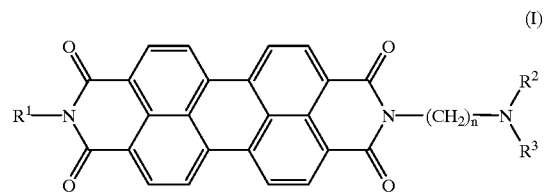

in which
$R^1$ is a hydrogen atom, a hydroxyl or amino group or a $C_1$–$C_{20}$-alkyl group which is perfluorinated or partly fluorinated and is optionally substituted by chlorine or bromine atoms, a phenyl group, cyano, hydroxyl, carbamoyl, $C_2$–$C_4$-acyl or $C_1$–$C_4$-alkoxy groups; and $R^2$ and $R^3$ independently of one another are a hydrogen atom, a substituted or unsubstituted, or perfluorinated or partly fluorinated alkyl group of 1 to 20 carbon atoms, or a substituted or unsubstituted, or perfluorinated or partly fluorinated alkenyl group of 2 to 20 carbon atoms, it being possible for the substituents to be hydroxyl, phenyl, cyano, chlorine, bromine, $C_2$–$C_4$-acyl or $C_1$–$C_4$-alkoxy and to be 1 to 4 in number; or $R^2$ and $R^3$, together with the nitrogen atom, form a saturated, unsaturated or aromatic heterocyclic ring which optionally contains a further nitrogen, oxygen or sulfur atom in the ring; and n is a number from 1 to 6;
or compounds having the formula (II)

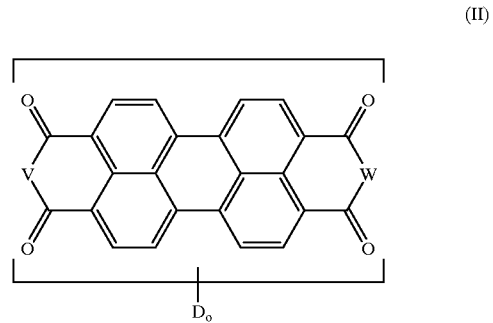

are employed in which
V is a bivalent radical —O—, >$NR^4$ or >$NR^5$—$Y^-X^+$ and
W is the bivalent radical >$NR^5$—$Y^-X^+$,
D is a chlorine or bromine atom and if o>1, optionally represents a combination thereof, and o is a number from 0 to 4;
$R^4$ is a hydrogen atom or a $C_1$–$C_{18}$-alkyl group, or is a phenyl group which is unsubstituted or substituted by halogen, $C_1$–$C_4$-alkyl, $C_1$–$C_4$-alkoxy, or phenylazo, R⁵ is a $C_1$–$C_{18}$-alkylene group which group can contain one or more bridging links selected from the group consisting of —O—, —NR⁶—, —S—, phenylene, —CO—, —SO₂— and —CR⁷R⁸— a combination thereof and in which R⁶, R⁷ and R⁸ independently of one another are each a hydrogen atom or a $C_1$–$C_4$-alkyl group which is unsubstituted or substituted by a heterocyclic radical, or R⁵ is a phenylene group which is unsubstituted or substituted by $C_1$–$C_4$-alkyl or by $C_1$–$C_4$-alkoxy, Y⁻ is one of the anionic radicals —SO₃⁻ and —COO⁻, and X⁺ is a proton or the equivalent

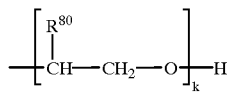

of a metal cation from main groups 1 to 5 or transition groups 1 or 2 or 4 to 8 of the Periodic Table of the Chemical Elements, m being 1, 2 or 3, or defines an ammonium ion N⁺R⁹R¹⁰R¹¹R¹² having a quaternary nitrogen atom, the substituents R⁹, R¹⁰, R¹¹ and R¹² on the quaternary nitrogen atom being each independently of one another a hydrogen atom or a group from the series consisting of $C_1$–$C_{30}$-alkyl, $C_2$–$C_{30}$-alkenyl, $C_5$–$C_{30}$-cycloalkyl, unsubstituted or $C_1$–$C_8$-alkylated phenyl or a (poly)alkyleneoxy group $$\left[\begin{array}{c}R^{80}\\|\\CH-CH_2-O\end{array}\right]_k H$$

in which R⁸⁰ is hydrogen or $C_1$–$C_4$-alkyl and k is a number from 1 to 30;

and in which alkyl, alkenyl, cycloalkyl, phenyl or alkylphenyl identified as R⁹, R¹⁰, R¹¹ and R¹² are optionally substituted by amino, hydroxyl, carboxy, or a combination thereof;

or where the substituents R⁹ and R¹⁰ together with the quarternary nitrogen atom, form a five- to seven-membered saturated ring system which optionally includes oxygen, sulfur or nitrogen heteroatoms, or where the substituents R⁹, R¹⁰ and R¹¹, together with the quaternary nitrogen atom, form a 5- to 7-membered aromatic ring system which optionally includes oxygen, sulfur or nitrogen heteroatoms and to which additional rings are optionally fused on, or compounds having the formula (III)

(III)

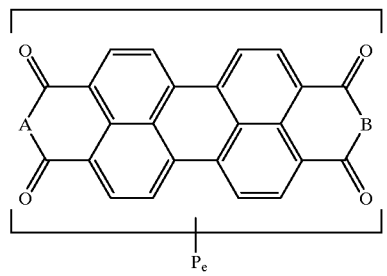

are employed in which

A is a bivalent radical of the formula

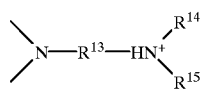

and

B is an bivalent radical of the formula

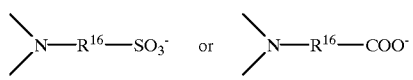

e is a number from 0 to 8 and, if e>0,

P is a chlorine or bromine atom, and if e>1, P optionally represents a combination thereof, R¹³ is a $C_1$–$C_{12}$-alkylene group, an aralkylene group or an arylene group, R¹⁴ and R¹⁵ are identical or different and are a hydrogen atom, a substituted or unsubstituted $C_1$–$C_{20}$-alkyl radical, or a substituted or unsubstituted $C_2$–$C_{20}$-alkenyl radical, that R¹⁴ and R¹⁵ are not simultaneously hydrogen, or R¹⁴ and R¹⁵, together with the adjacent nitrogen atom, form a heterocyclic ring system which optionally contains the heteroatoms O, S or N in the ring and to which additional rings are optionally fused on, and R¹⁶ is a straight-chain or branched $C_1$–$C_{12}$-alkylene group;

or compounds having the formula (IV)

(IV)

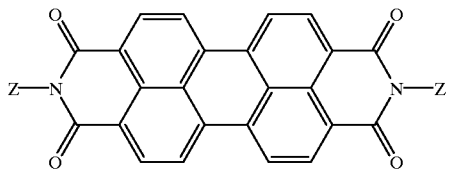

are employed, in which Z has the definition Z¹, Z² or Z³, with the proviso that both radicals Z are not simultaneously Z³, where Z¹ is a radical of the formula (IVa)

—[X—Y]_q—[X¹—Y¹]_r—[X²—NH]_sH  (IVa)

in which

X, X¹ and X² are identical or different and are a branched or unbranched $C_2$–$C_6$-alkylene radical, or a $C_5$–$C_7$-cycloalkylene radical which is optionally substituted by from 1 to 4 $C_1$–$C_4$-alkyl radicals, hydroxyl radicals, hydroxyalkyl radicals of 1 to 4 carbon atoms or by 1 to 2 $C_5$–$C_7$-cycloalkyl radicals;

Y and Y¹ are identical or different and are an NH—, —O— or N($C_1$–$C_6$-alkyl) group, or 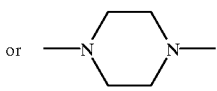

q is a number from 1 to 6, r and s independently of one another are a number from 0 to 6, and r and s are not simultaneously zero;

$Z^2$ is a radical of the formula (IVb)

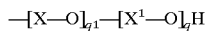 (IVb)

in which q1 is a number from 0 to 6; and $Z^3$ is hydrogen, hydroxyl, amino or $C_1$–$C_8$-alkyl, it being possible for the alkyl group to be substituted by 1 to 4 substituents from the group consisting of Cl, Br, CN, OH, $C_6H_5$, carbamoyl, $C_1$–$C_4$-acyl, $C_1$–$C_4$-alkoxy and $NR^2R^3$, or is perfluorinated or partly fluorinated, where $R^2$ and $R^3$ independently of one another are a hydrogen atom or a substituted or unsubstituted, or perfluorinated or partly fluorinated alkyl group of 1 to 20 carbon atoms, or a substituted or unsubstituted, or perfluorinated or partly fluorinated alkenyl group of 2 to 20 carbon atoms, it being possible for the substituents to be hydroxyl, phenyl, cyano, chlorine, bromine, $C_2$–$C_4$-acyl or $C_1$–$C_4$-alkoxy, or $R^2$ and $R^3$, together with the nitrogen atom, form a saturated, unsaturated or aromatic heterocyclic ring which optionally contains a further nitrogen, oxygen or sulfur atom in the ring.

2. The process as claimed in claim 1, wherein from 3 to 10 times the molar amount of monomethylamine is employed per mole of perylene-3,4,9,10-tetra-carboxylic dianhydride.

3. The process as claimed in claim 1, wherein from 3 to 8 times the molar amount of monomethylamine is employed per mole of perylene-3,4,9,10-tetra-carboxylic dianhydride.

4. The process as claimed in claim 1, wherein the monomethylamine is added at from 0 to 80° C.

5. The process as claimed in claim 1, wherein the monomethylamine is added at from 20 to 60° C.

6. The process as claimed in claim 1, wherein from 5 to 12 times the amount by weight of water, based on the weight of the dianhydride, is employed.

7. The process as claimed in claim 1, wherein from 6 to 9 times the amount by weight of water, based on the weight of the dianhydride, is employed.

8. The process as claimed in claim 1, wherein the residence time of the crude pigment in the stirred ballmill is from 5 to 60 minutes.

9. The process as claimed in claim 1, wherein the residence time of the crude pigment in the stirred ballmill is from 10 to 45 minutes.

10. The process as claimed in claim 1, wherein anionic, cationic or nonionic surfactants or a combination thereof which do not foam during the distillation of the monomethylamine or during grinding are employed.

11. The process as claimed in claim 1, wherein surfactants employed are fatty acid taurides, resin soaps, ammonium salts of fatty amines, or a condensation product of cyanuric chloride, taurine, N,N'-diethylaminopropylamine and p-phenylenediamine.

12. The process as claimed in claim 1, wherein a total of from 5 to 15% by weight of surfactants, pigment dispersants or a combination thereof is added, based on the crude pigment.

* * * * *